United States Patent [19]

Charng

[11] Patent Number: 5,235,721
[45] Date of Patent: Aug. 17, 1993

[54] WINDSHIELD WIPER REFILL AND IMPROVED END CLIP THEREFOR

[75] Inventor: Cedric S. K. Charng, Taipei City, Taiwan

[73] Assignee: China Wiper Special Rubber Co., Ltd., Taipei, Taiwan

[21] Appl. No.: 893,389

[22] Filed: Jun. 4, 1992

[30] Foreign Application Priority Data

Mar. 25, 1992 [GB] United Kingdom ................. 9206511

[51] Int. Cl.⁵ .............................................. B60S 1/38
[52] U.S. Cl. .............................. 15/250.42; 15/250.31
[58] Field of Search .......... 15/250.42, 250.31, 250.37, 15/250.35, 250.36, 250.41

[56] References Cited

U.S. PATENT DOCUMENTS

| 3,879,794 | 4/1975 | Roberts, Jr. | 15/250.42 |
| 3,885,265 | 5/1975 | Deibel et al. | 15/250.42 |
| 4,009,503 | 3/1977 | Sharp | 15/250.42 |
| 4,156,951 | 6/1979 | Sharp | 15/250.42 |
| 4,360,943 | 11/1982 | Thompson et al. | 15/250.42 |
| 4,442,566 | 4/1984 | Sharp | 15/250.42 |
| 4,501,043 | 2/1985 | Plisky | 15/250.42 |
| 4,566,147 | 1/1986 | Baerenwald et al. | 15/250.42 |
| 4,583,259 | 4/1986 | Will | 15/250.42 |
| 4,679,276 | 7/1987 | Tomkin | 15/250.42 |

Primary Examiner—Harvey C. Hornsby
Assistant Examiner—Gary K. Graham
Attorney, Agent, or Firm—Howson & Howson

[57] ABSTRACT

A wiper refill unit comprising a backing strip and a metallic end clip detachably connected to an end thereof, the end clip having an end wall with a forwardly extending projection therein and, extending forwardly from the end wall, a top wall comprising spaced apart resiliently deflectable legs and an attachment part with a downturned tab. The tab is inserted in an aperture adjacent one end of the backing strip and the latter is received in a space between the free end of the projection and the overlying end clip top wall.

2 Claims, 2 Drawing Sheets

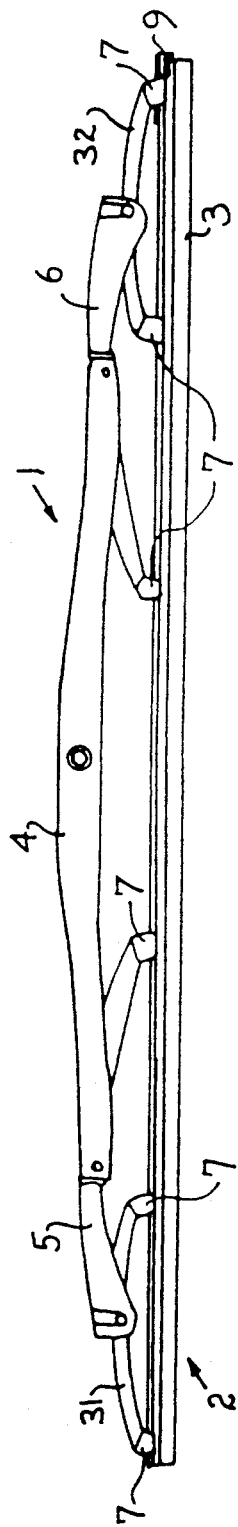
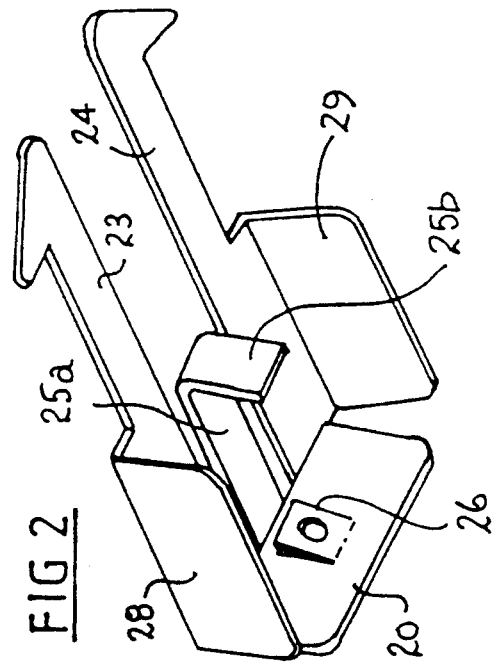

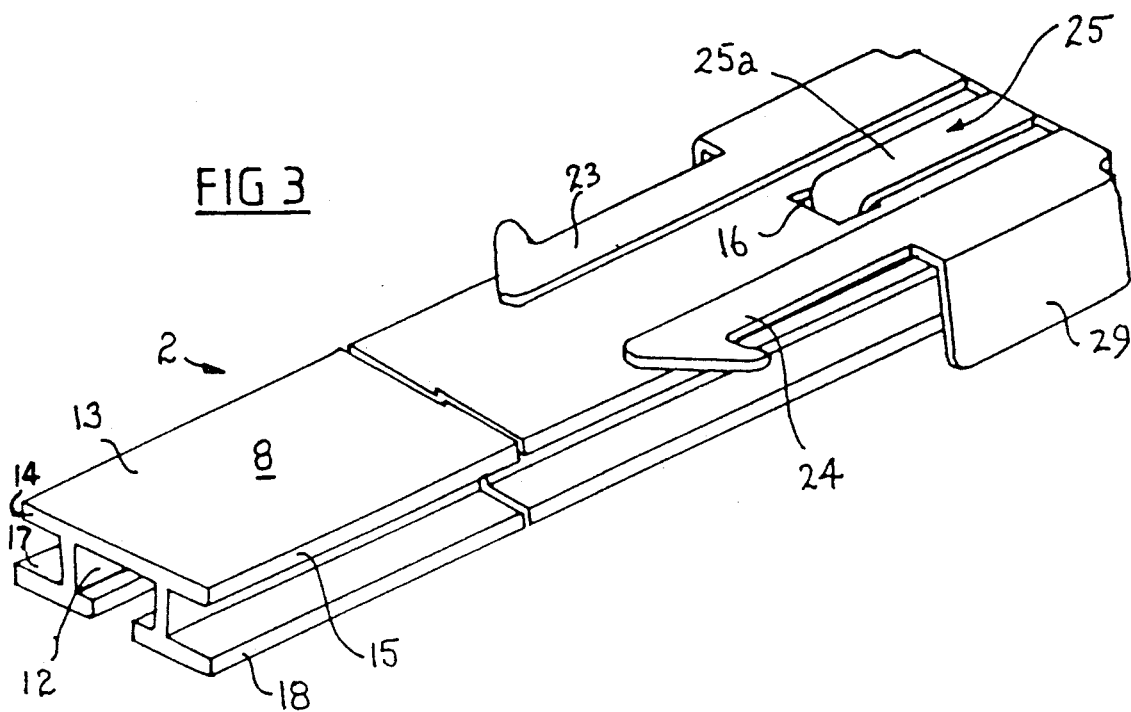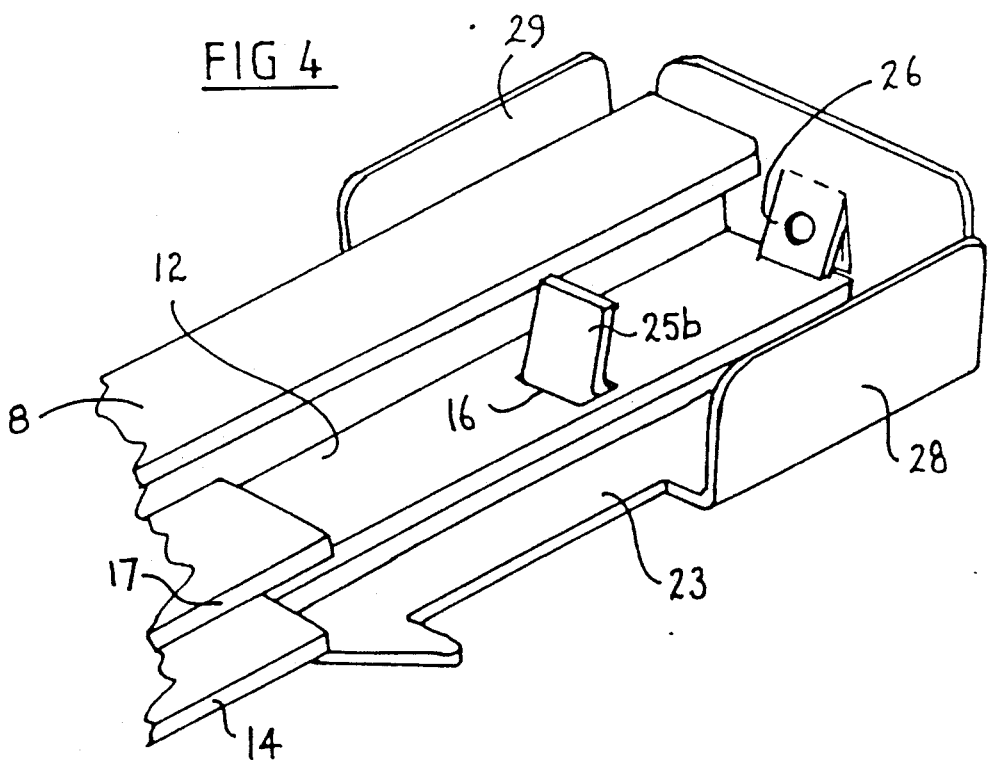

WINDSHIELD WIPER REFILL AND IMPROVED END CLIP THEREFOR

BACKGROUND OF THE INVENTION

This invention relates to a refill unit for removable attachment to a wiper blade superstructure. The invention also relates to a metallic end clip for such a refill unit.

Wiper blade refill units are well known and generally comprise an elongate flexible plastics backing strip with at least one slot therein for receiving at least one elongate resilient wiping element. One end of the or each slot may be permanently closed, e.g. by crimping the plastics material defining the slot(s), and the other end of the or each slot may be closed by means of a removable metallic end clip. In addition to closing the end of the slot(s), the end clip has resiliently deflectable legs which engage with claw members of a wiper blade superstructure to which the wiper refill unit is detachably connected.

Many different types of metallic wiper clip are known from the prior art. Examples of known metallic wiper clips are shown in U.S. Pat. Nos. 3,885,265, 4,009,503, 4,156,951, 4,442,566, 4,566,147 and 4,583,259. Not all of these prior art specifications relate to end clips but they all have various types of attachment means for attaching the wiper clip to the backing strip.

SUMMARY OF THE INVENTION

An object of the present invention is to provide a new and improved refill unit for a wiper blade superstructure incorporating a metallic wiper end clip.

Another object of the present invention is to provide a metallic wiper end clip having a secure means of attachment to a backing strip.

A further object of the present invention is to provide a means for detachably connecting an end clip to a backing strip involving retaining an end of a top wall of the backing strip between a top part of the end clip and an inwardly directed projection formed on an end wall of the end clip.

According to one aspect of the present invention there is provided a wiper refill unit for removable attachment to a wiper blade superstructure having a set of claw members, the refill unit comprising an elongate flexible backing strip with opposite first and second ends and having at least one slot means defining at least one elongate slot open towards the bottom, and at least one end, of the strip for receiving at least one elongate resilient wiping element, and a top wall providing spaced apart elongate side flanges extending along opposite sides of the backing strip and intended in use to be embraced by the claw members of the wiper blade superstructure and, between said side flanges, an elongate central portion having an aperture therein adjacent, but spaced from, said first end, and a metallic end clip having an end wall, top wall means extending forwardly from the top of the end wall and comprising a pair of spaced apart resiliently deflectable legs and an attachment part including a downturned tab for reception in said aperture, and at least one forwardly extending projection formed in the end wall and spaced beneath the top wall means to enable a portion of the top wall of the backing strip adjacent the first end of the latter to be retained between the top wall means and the underlying projection(s) when the tab is received in the aperture of the backing strip.

Conveniently the backing strip is made of extruded plastics material.

Preferably the distance between the base of the downturned tab and the end wall is equal to or greater than the distance between the first end of the backing strip and the said aperture.

According to another aspect of the present invention there is provided a metallic end clip for detachable attachment to an end of an elongate flexible backing strip of a wiper blade unit, the end clip having an end wall, top wall means extending forwardly from the top of the end wall and comprising a pair of spaced apart resiliently deflectable legs and an attachment part including a downturned tab locatable in an aperture formed adjacent an end of a wiper blade backing strip, and at least one forwardly extending projection formed in the end wall and spaced beneath the top wall means to enable a portion of a top wall of the backing strip to be retained between the top wall means and the underlying projection(s).

BRIEF DESCRIPTION OF THE DRAWINGS

The invention will now be described, by way of example, with particular reference to the accompanying drawings, in which:

FIG. 1 is a side view of a wiper refill unit according to the present invention removably attached to a wiper blade superstructure;

FIG. 2 is a perspective view of a metallic wiper end clip according to the invention;

FIG. 3 shows the end clip of FIG. 2 attached to a first end of a plastics backing strip; and FIG. 4 shows a partly cut away view of the first end of the backing strip having the end clip shown in FIG. 2 detachably connected thereto.

DESCRIPTION OF THE PREFERRED EMBODIMENTS

FIG. 1 shows a wiper blade assembly comprising a wiper blade superstructure, generally designated 1, and a refill unit, generally designated 2, removably attached to the superstructure 1. The superstructure 1 comprises a primary yoke 4 with secondary yokes 5 and 6 pivotally connected to opposite ends thereof. The outer ends of the secondary yokes 5 and 6 have tertiary yokes 31 and 32, respectively, pivotally connected thereto and the opposite ends of each tertiary yoke and the inner ends of each secondary yoke are provided with claw members 7. The wiper blade superstructure may be of any known design, the invention primarily being directed to refill units for removable attachment to any of a number of different designs of wiper blade superstructure.

The refill unit 2 is shown in more detail in FIGS. 3 and 4 and comprises an elongate one-piece flexible backing strip 8 extruded from plastics material and a metallic end clip 9 (see FIGS. 2-4) detachably connected to one end of the backing strip. The backing strip 8 is provided with an elongate slot 12 extending from end to end of the backing strip and opening downwardly for slidably receiving a bead portion of the wiping element 3. The backing strip has a top wall 13 defining spaced apart elongate upper side flanges 14 and 15 and an elongate central portion therebetween and spaced apart lower side flanges 17 and 18. Spaced from, but adjacent to, one end of the backing strip 8, an aperture 16 is provided in the central portion of the top wall 13. Although not shown, the end of the backing strip 8 remote from the end clip 9 may be crimped or otherwise deformed to retain the wiping element in the slot 12.

The metallic end clip 9 comprises an end wall 20 and, extending forwardly from the upper edge of the end wall 20, a pair of spaced apart resiliently deflectable legs 23 and 24 and, between the legs, a central attachment part 25. The attachment part 25 includes a first part 25*a* lying generally in the plane of the legs 23 and 24 and a second part, in the form of a downturned tab 25*b*, at the free end of the attachment part 25. An inverted channel shaped cut is formed in the end wall 20 to permit a rectangular shaped projection to be pressed inwardly from the end wall to provide a forwardly or inwardly inclined projection 26. The free end of the projection 26 is spaced from the overlying top wall of the clip provided by the legs 23 and 24 and attachment part 25*a*. Side walls 28 and 29 are joined to the legs 23 and 24, respectively and can be squeezed manually to resiliently inwardly deflect the legs 23 and 24.

In use the tab 25*b* of the attachment part 25 is inserted into the aperture 16 in the backing strip 8 and the rear part of the end clip 9 is pushed downwardly against the top wall 13 of the backing strip 8. The end of the backing strip engages the inclined inwardly directed projection 26 deflecting the latter resiliently inwardly until the top wall 13 clears the projection 26 and is located between the overlying top wall of the end clip and the inwardly positioned free end of the projection 26. As the backing strip moves into its final position, the projection 26 springs back into its inwardly inclined position trapping the top wall of the backing strip in position. It will be appreciated that the gap between the free end of the projection 26 and the overlying top wall of the end clip will be slightly greater than or equal to the thickness of the top wall of the backing strip to prevent the rear end of the clip moving "vertically" relative to the backing strip 8. Furthermore, the distance between the end wall 20 and the downturned tab 25*b* where the latter is joined to the first attachment part 25*a* is slightly greater than or equal to the distance between the end of the backing strip to which the clip is attached and the wall of the aperture 16 which is closest to this end to prevent "horizontal" movement of the clip relative to the backing strip 8. When the end clip 9 is so attached to the end of the backing strip 8, the legs 23 and 24 overly the side edges 14 and 15, respectively, of the top wall 13 of the backing strip 8. The end clip is retained in its attached position by the engagement of the tab 25*b* in the aperture 16 and the positioning of the end of the top wall 13 of the backing strip 8 between the free end of the projection 26 and the overlying top wall of the end clip 9 provided by the legs 23 and 24 and the first attachment part 25*a*. This provides a secure attachment of the end clip to the backing strip. When the wiper refill 2 is connected to the wiper blade superstructure, the claws 7 embrace the side edges 14 and 15, the lower parts of the claws being received in the channels defined between the spaced apart side edges 14 and 17 and 15 and 18. The claw 7 at one end of the wiper blade superstructure is received in recesses 23*a* and 24*a* formed in the legs 23 and 24, respectively, to retain the refill 2 in position on the superstructure. To release the wiper refill, the legs 23 and 24 are resiliently squeezed together to release the endmost claw from the recesses 23*a* and 24*a* and the refill 2 is slid off the superstructure.

In other embodiments of the invention, it is possible for the backing strip 8 to have different forms. For example, the backing strip may be of the type provided with a pair of elongate channels for receiving a pair of elongate wiping members. Alternatively, it is even possible for the tab 25*b*, instead of being fixed directly to and extending from the end wall 20, to be connected to one of the legs 23, 24. Alternatively, a separate tab could be fixed to each of the legs 23 and 24.

I claim:

1. A wiper refill unit for removable attachment to a wiper blade superstructure having a set of claw members, the refill unit comprising:

an elongate flexible backing strip with opposite first and second ends and having a bottom, at least one slot means defining at least one elongate slot open towards said bottom of the backing strip, and towards at least one end of the backing strip for receiving at least one elongate resilient wiping element;

a top wall providing spaced apart elongate side flanges extending along opposite sides of the backing strip and intended in use to be embraced by the claw members of the wiper blade superstructure; and an elongate central portion between said side flanges, said central portion having an aperture therein adjacent, but spaced from, said first end; and a metallic end clip having an end wall with a top, top wall means extending forwardly from said top of the end wall and comprising a pair of spaced apart resiliently deflectable legs and an attachment part including a downturned tab for reception in said aperture, said tab having a base, and at least one forwardly extending projection formed in the end wall and spaced beneath the top wall means to enable a portion of the top wall of the backing strip adjacent the first end of said backing strip to be retained between the top wall means and the underlying said at least one projection when the tab is received in the aperture of the backing strip with the top wall means overlying the top wall of the backing strip;

in which said attachment part extends forwardly from said top of the end wall of said metallic end clip, and in which the end of said attachment part remote from said end wall is bent downward to form said downturned tab; and in which the portion of said attachment part extending from said top to the end wall to said downturned tab is located between said pair of spaced apart resiliently deflectable legs.

2. A wiper refill unit for removable attachment to a wiper blade superstructure having a set of claw members, the refill unit comprising:

an elongate flexible backing strip with opposite first and second ends and having a bottom, at least one slot means defining at least one elongate slot open towards said bottom of the backing strip, and towards at least one end of the backing strip for receiving at least one elongate resilient wiping element;

a top wall providing spaced apart elongate side flanges extending along opposite sides of the backing strip and intended in use to be embraced by the claw members of the wiper blade superstructure; and an elongate central portion between said side flanges, said central portion having an aperture therein adjacent, but spaced from, said first end; and a metallic end clip having an end wall with a top, top wall means extending forwardly from said top of the end wall and comprising a pair of spaced apart resiliently deflectable legs and an attachment part including a downturned tab for reception in said aperture, said tab having a base, and at least one forwardly extending projection formed in the end wall and spaced beneath the top wall means to enable a portion of the top wall of the backing strip adjacent the first end of said backing strip to be retained between the top wall means and the underlying said at least one projection when the tab is received in the aperture of the backing strip with the top wall means overlying the top wall of the backing strip;

in which said attachment part extends forwardly from said top of the end wall of said metallic end clip, and in which the end of said attachment part remote from said end wall is bent downward to form said downturned tab;

in which said aperture is located in said top wall of the backing strip; and in which the portion of said attachment part extending from said top of the end wall to said downturned tab is located between said pair of spaced apart resiliently deflectable legs.

* * * * *